US012289792B2

(12) United States Patent
Abedini et al.

(10) Patent No.: US 12,289,792 B2
(45) Date of Patent: Apr. 29, 2025

(54) DISCOVERY PROCEDURE OF A LOCAL NETWORK OF ASSISTING NODES

(71) Applicant: QUALCOMM Incorporated, San Diego, CA (US)

(72) Inventors: Navid Abedini, Basking Ridge, NJ (US); Kapil Gulati, Belle Mead, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/645,012

(22) Filed: Dec. 17, 2021

(65) Prior Publication Data

US 2023/0199467 A1    Jun. 22, 2023

(51) Int. Cl.
*H04W 48/20* (2009.01)
*H04W 8/00* (2009.01)
*H04W 48/16* (2009.01)
*H04W 52/46* (2009.01)
*H04W 56/00* (2009.01)
*H04W 72/20* (2023.01)

(52) U.S. Cl.
CPC .......... *H04W 8/005* (2013.01); *H04W 48/16* (2013.01); *H04W 52/46* (2013.01); *H04W 56/001* (2013.01); *H04W 72/20* (2023.01)

(58) Field of Classification Search
CPC ..... H04W 8/005; H04W 48/16; H04W 52/46; H04W 56/001; H04W 72/20; H04W 8/24; H04W 74/0833; H04W 84/18; H04W 88/04
See application file for complete search history.

(56) References Cited

U.S. PATENT DOCUMENTS

| 1,622,416 | A  | * | 3/1927  | Burton ................. | B60S 1/3805 |
| | | | | | 15/250.07 |
| 7,984,132 | B2 | | 7/2011 | Park et al. | |
| 11,622,416 | B2 | * | 4/2023 | Zhang ................. | H04W 8/005 |
| | | | | | 370/315 |
| 2009/0323647 | A1 | | 12/2009 | Park et al. | |
| 2013/0033999 | A1 | | 2/2013 | Siomina et al. | |
| 2017/0150340 | A1 | * | 5/2017 | Park .................. | H04W 74/0833 |
| 2019/0014535 | A1 | * | 1/2019 | Chen ................... | H04W 72/23 |
| 2022/0191934 | A1 | * | 6/2022 | Miao ................ | H04W 74/0833 |

(Continued)

FOREIGN PATENT DOCUMENTS

WO    2009158656 A1    12/2009

OTHER PUBLICATIONS

International Search Report and Written Opinion—PCT/US2022/049863—ISA/EPO—May 30, 2023.

(Continued)

*Primary Examiner* — Hanh N Nguyen
(74) *Attorney, Agent, or Firm* — Procopio, Cory, Hargreaves & Savitch LLP/Qualcomm Incorporated

(57) ABSTRACT

Methods, apparatuses, and computer readable medium for assisting node discovery are provided. An example method may include receiving, from a network node, an indication of a communication with a second assisting node. The example method may further include transmitting the communication to the second assisting node or discovering a third assisting node based on information associated with the second assisting node.

27 Claims, 13 Drawing Sheets

(56) References Cited

U.S. PATENT DOCUMENTS

| | | | |
|---|---|---|---|
| 2022/0286946 A1* | 9/2022 | Abedini | H04W 48/20 |
| 2022/0295544 A1 | 9/2022 | Wei et al. | |
| 2023/0133803 A1* | 5/2023 | Dutta | H04W 76/14 |
| | | | 370/315 |
| 2024/0406703 A1* | 12/2024 | Li | H04W 64/003 |

OTHER PUBLICATIONS

Partial International Search Report—PCT/US2022/049863—ISA/EPO—Mar. 3, 2023.

* cited by examiner

DISCOVERY PROCEDURE OF A LOCAL NETWORK OF ASSISTING NODES

TECHNICAL FIELD

The present disclosure relates generally to communication systems, and more particularly, to wireless communication systems with assisting nodes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at an assisting node are provided. The apparatus may include a memory and at least one processor coupled to the memory. The memory and the at least one processor coupled to the memory may be configured to receive, from a network node, an indication of a communication with a second assisting node. The memory and the at least one processor coupled to the memory may be further configured to transmit the communication to the second assisting node or discover a third assisting node based on information associated with the second assisting node.

In an aspect of the disclosure, a method, a computer-readable medium, and an apparatus at a network node are provided. The apparatus may include a memory and at least one processor coupled to the memory. The memory and the at least one processor coupled to the memory may be configured to identify one or more candidate assisting nodes based on one or more responses from the one or more candidate assisting nodes to one or more random access channel (RACH) occasions (ROs). The memory and the at least one processor coupled to the memory may be further configured to receive information associated with the one or more candidate assisting nodes. The memory and the at least one processor coupled to the memory may be further configured to select a subset of the one or more candidate assisting nodes based on the information. The memory and the at least one processor coupled to the memory may be further configured to transmit, to the subset of the one or more candidate assisting nodes, one or more instructions based on the information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
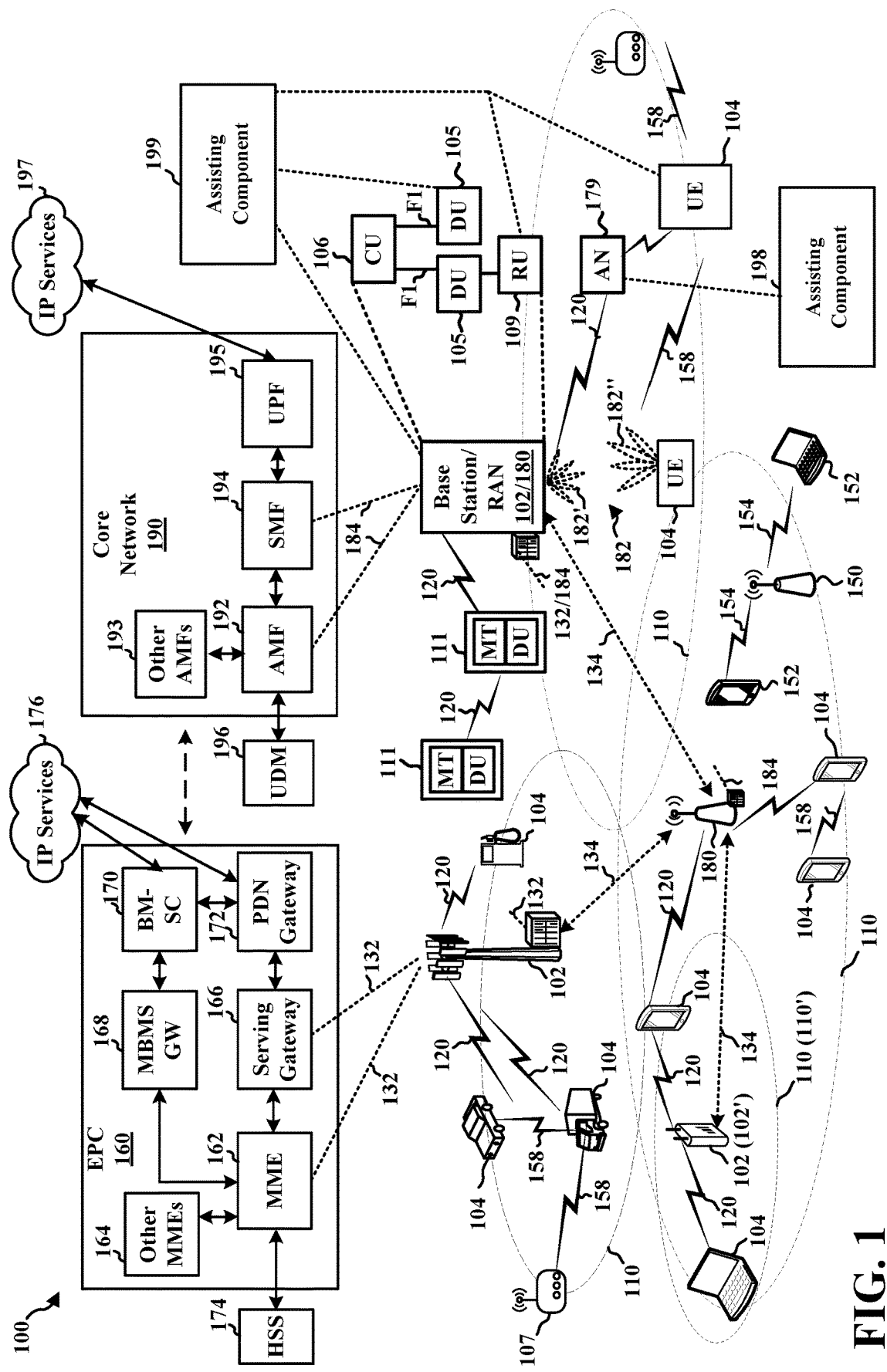
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution. FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DUs) 105, and/or at least one radio unit (RU) 109, as illustrated in FIG. 1. A RAN may be disaggregated with a split between an RU 109 and an aggregated CU/DU. A RAN may be disaggregated with a split between the CU 106, the DUs 105, and the RU 109. A RAN may be disaggregated with a split between the CU 106 and an aggregated DU/RU. The CU 106 and the one or more DUs 105 may be connected via an F1 interface. One of the DUs 105 and an RU 109 may be connected via a fronthaul interface. A connection between the CU 106 and one of the DUs 105 may be referred to as a midhaul, and a connection between one of the DUs 105 and an RU 109 may be referred to as a fronthaul. The connection between the CU 106 and the core network may be referred to as the backhaul. The RAN may be based on a functional split between various components of the RAN, e.g., between the CU 106, the DUs 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, DUs 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, cNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 or the base station 180 may include an assisting component 199. In some aspects, the assisting component 199 may be configured to identify one or more candidate assisting nodes based on one or more responses from the one or more candidate assisting nodes to one or more ROs. In some aspects, the assisting component 199 may be further configured to receive information associated with the one or more candidate assisting nodes. In some aspects, the assisting component 199 may be further configured to select a subset of the one or more candidate assisting nodes based on the information. In some aspects, the assisting component 199 may be further configured to transmit, to the subset of the one or more candidate assisting nodes, one or more instructions based on the information.

In some aspects, the base station 180 and the UE 104 may communicate via one or more assisting nodes 179. In certain aspects, the assisting node 179 may include an assisting component 198. In some aspects, the assisting component 198 may be configured to receive, from a network node, an indication of a communication with a second assisting node. In some aspects, the assisting component 198 may be further configured to transmit the communication to the second assisting node or discover a third assisting node based on information associated with the second assisting node.

Although the following description may be focused on 5G NR, the concepts described herein may be applicable to other similar areas, such as LTE, LTE-A, CDMA, GSM, and other wireless technologies.

Figure 2:
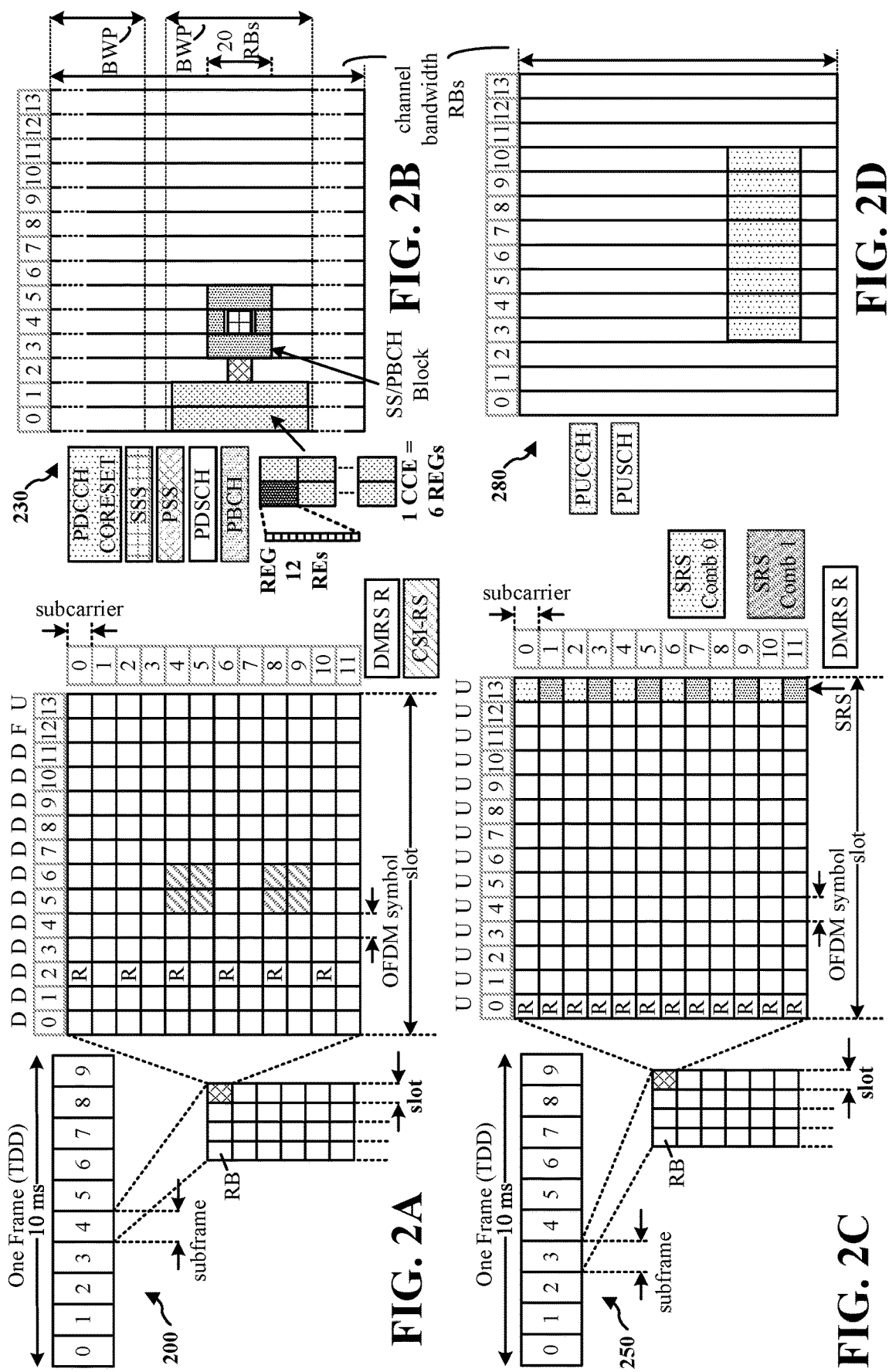
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
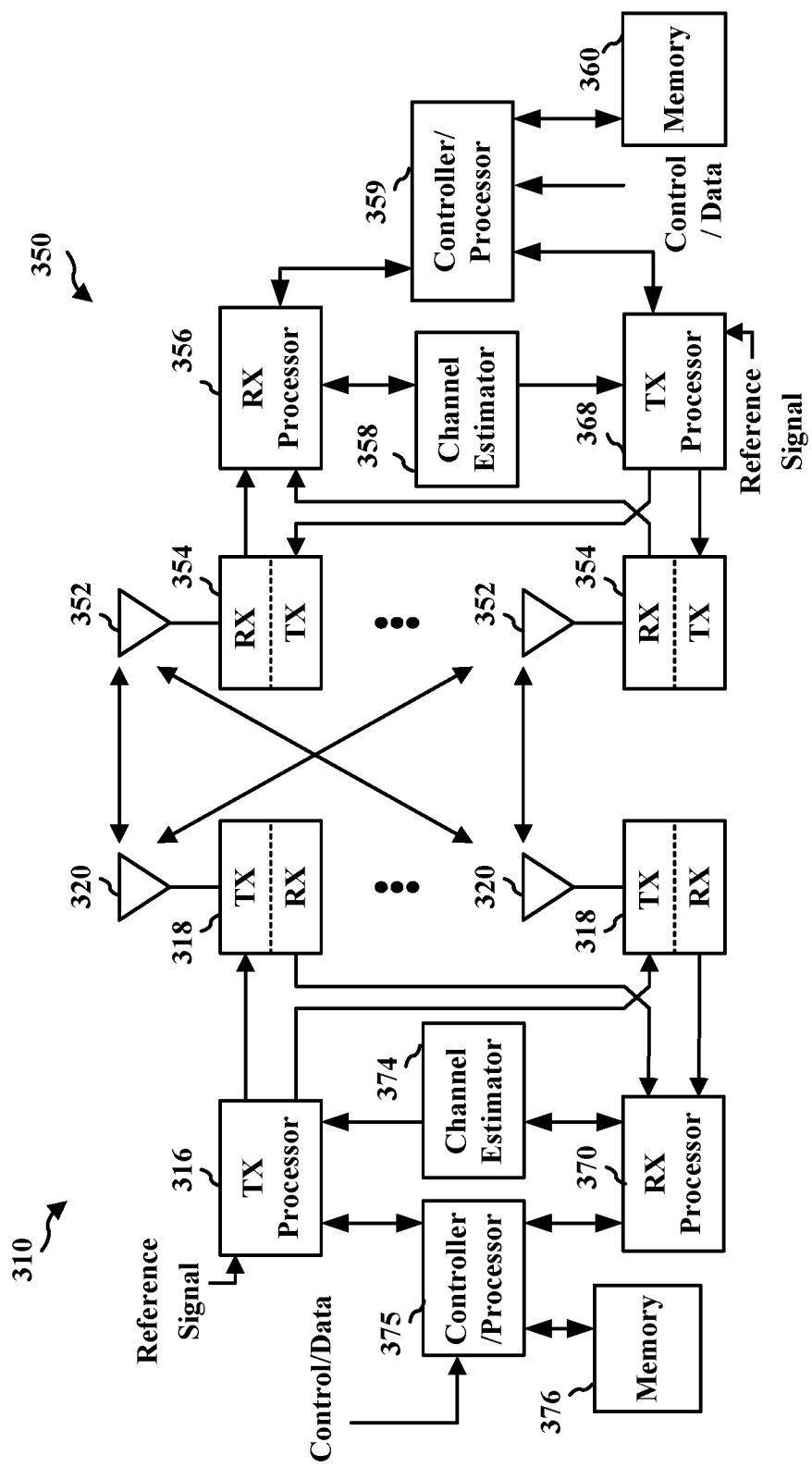
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with assisting component 198 of FIG. 1.

At least one of the TX processor 316, the RX processor 370, and the controller/processor 375 may be configured to perform aspects in connection with assisting component 199 of FIG. 1.

Figure 4:
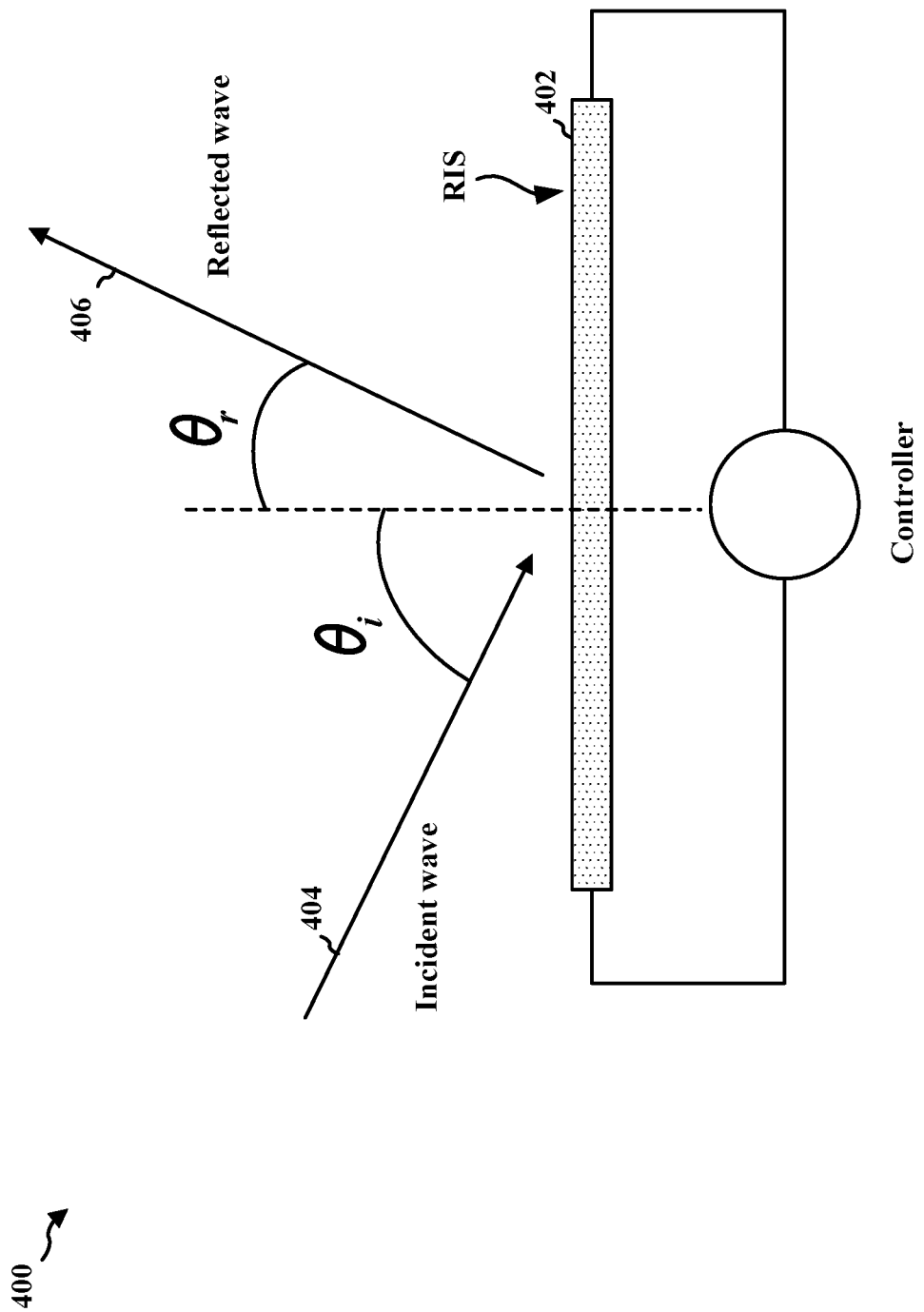
FIG. 4 is a diagram illustrating an example assisting node in the form of a reconfigurable intelligent surface (RIS).

Assisting nodes, such as a RIS or a repeater, may be used in a wireless communication network to facilitate communication between network nodes, such as UEs and base stations. In some aspects, an assisting node may forward received signals carrying communications between UEs and base stations without digitally processing the communications. A RIS may be a two-dimensional surface of engineered material where the properties are reconfigurable rather than static. For example, the scattering, absorption, reflection, and diffraction properties may be configurable and controlled. RISs may be low-power passive devices without a transceiver that can act as a phased array. RISs may be used to steer an incident wave in the desired direction using a controller. For example, FIG. 4 is a diagram 400 illustrating an example assisting node in the form of a RIS. As illustrated in FIG. 4, the RIS 402 may reflect an incident wave 404 into a reflected wave 406 in a particular direction. The angle at which the incident wave 404 arrives may be an angle of arrival (AoA). The reflection direction of the reflected wave 406 may be different based on different configurations of the RIS. The RIS's configuration may be controlled by another wireless device, such as a UE or a base station. Usage of a RIS may also change the channel environment. Because RISs may be low-power passive devices (or near passive devices), RISs may be deployed to extend coverage for wireless communication systems with negligible increased power consumption.

A repeater may be a wireless device that receives a signal and retransmits the signal. An example repeater may retransmit the signal without decoding it. Repeaters may be used to extend transmissions so that a signal with a weaker power may cover a longer distance and may be received by devices that may be obstructed from receiving the signal or too far away to receive the signal.

Figure 5:
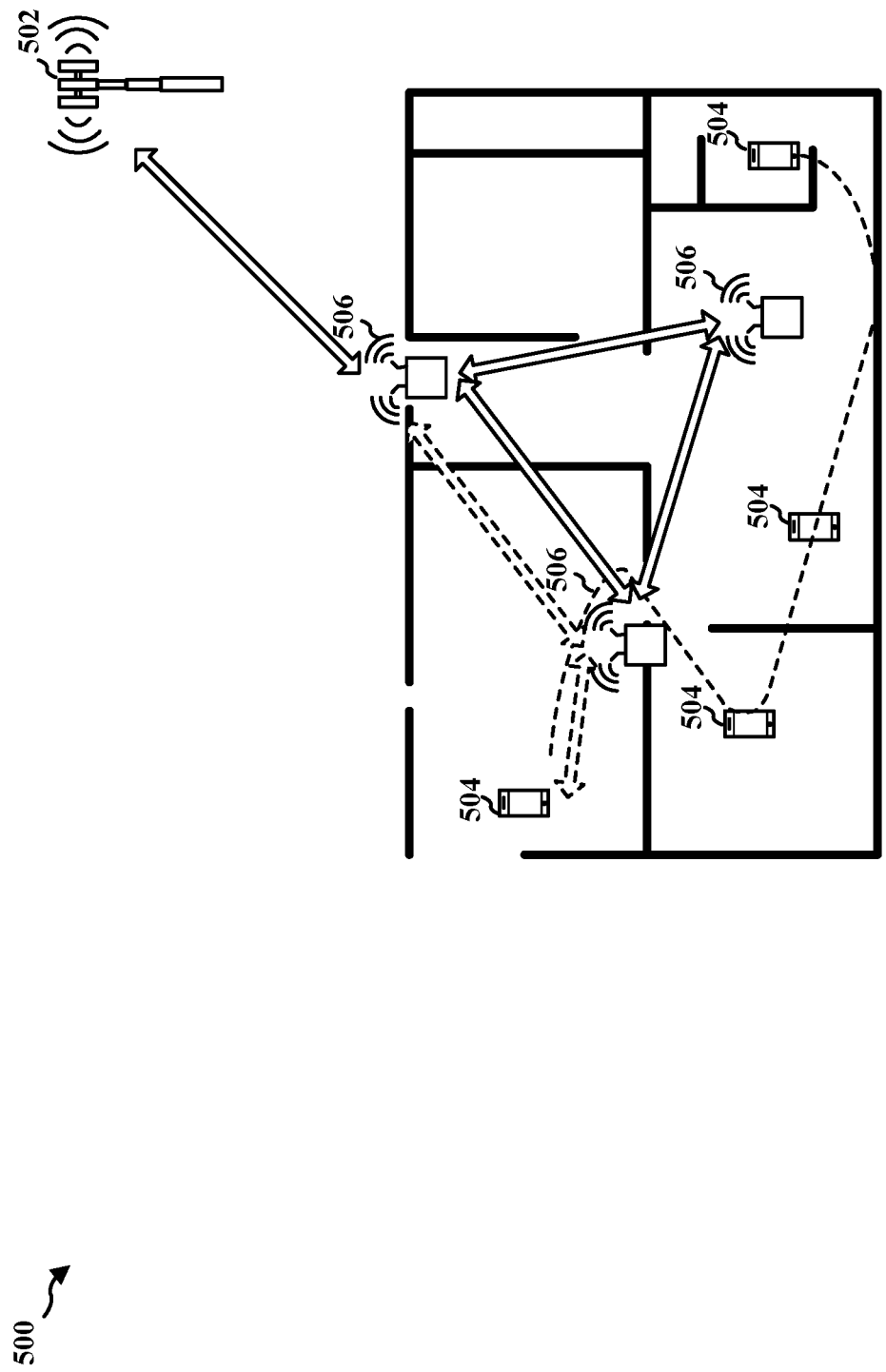
FIG. 5 is a diagram illustrating an example of a base station and UEs communicating via one or more assisting nodes in a network.

FIG. 5 is a diagram 500 illustrating an example of a base station 502 and UEs 504 communicating via one or more assisting nodes 506 in a local network. To establish the local network, a data path may be analog and potentially routed through multiple hops of assisting nodes 506 to establish a control interface among the assisting nodes. In some aspects, assisting nodes 506 may forward received signals carrying communications between UEs 504 and base station 502 without digitally processing the communications. The assisting nodes 506 may be used for extending coverage, reducing central management (e.g., by reducing the number of base stations covering the local network), saving power, and facilitating more efficient communication. In some aspects, the assisting nodes 506 may not be network controlled. Aspects provided herein may facilitate more efficient assisting node operations by providing mechanisms for assisting nodes to discover each other and establishing connections with a reduced central management.

Figure 6B:
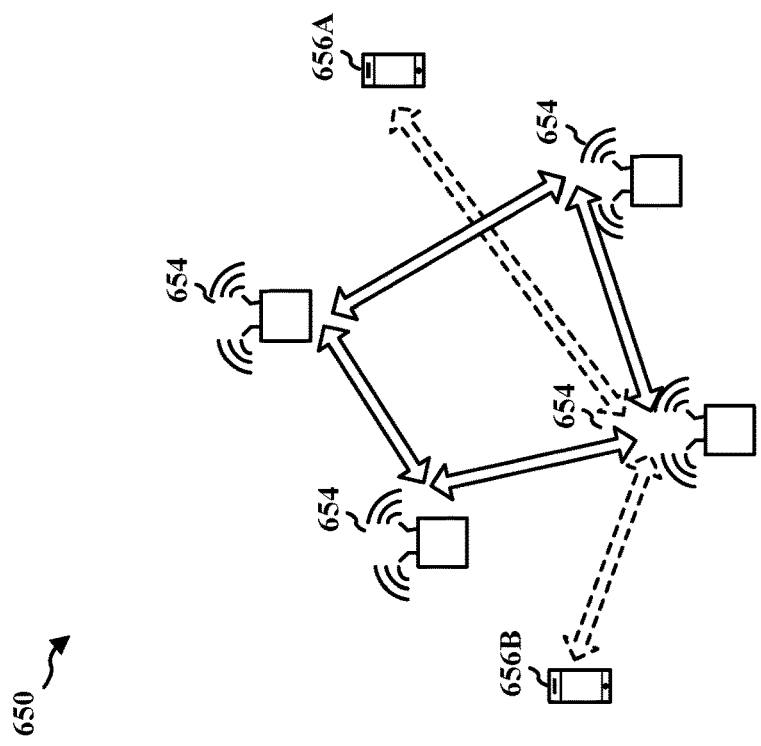
FIG. 6B is a diagram illustrating an example of UEs communicating via one or more assisting nodes in a network.
Figure 6A:
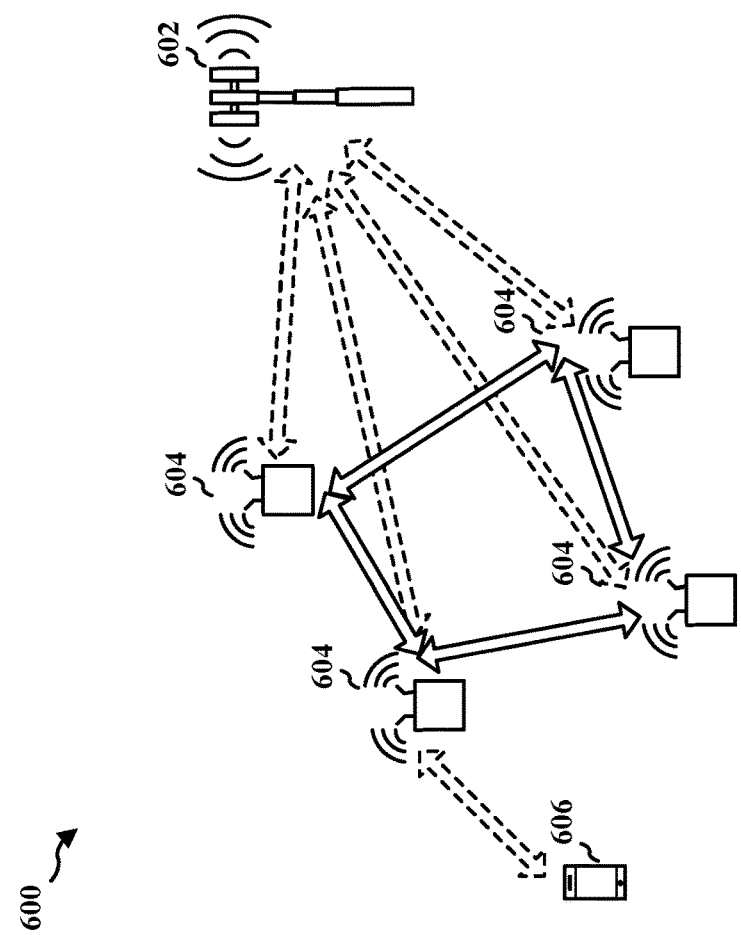
FIG. 6A is a diagram illustrating an example of a base station and a UE communicating via one or more assisting nodes in a network.

FIG. 6A is a diagram 600 illustrating an example of a base station 602 and a UE 606 communicating via one or more assisting nodes 604 in a network. As illustrated in FIG. 6A, the base station 602 may communicate with the UE 606 via the one or more assisting nodes 604. A downlink communication from the base station 602 to the UE 606 may be routed through multiple assisting nodes 604, which may each forward the communication without digitally processing the downlink communication. By utilizing the one or more assisting nodes 604, the downlink communication from the base station 602 to the UE 606 may be amplified, extended, and avoid being obstructed. Similarly, an uplink communication from the UE 606 to the base station 602 may be routed through multiple assisting nodes 604, which may each forward the uplink communication without digitally processing the uplink communication. By utilizing the one or more assisting nodes 604, the uplink communication from the UE 606 to the base station 602 may be amplified, extended, and avoid being obstructed.

FIG. 6B is a diagram 650 illustrating an example of UEs 656A and 656B communicating via one or more assisting nodes in a network. As illustrated in FIG. 6B, the UE 656A may communicate with the UE 656B via the one or more assisting nodes 654. A sidelink communication from the UE 656A to the UE 656B may be routed through multiple assisting nodes 654, which may each forward the sidelink communication without digitally processing the sidelink communication. By utilizing the one or more assisting nodes 654, the sidelink communication from the UE 656A to the UE 656B may be amplified, extended, and avoid being obstructed. Similarly, a sidelink communication from the UE 656B to the UE 656A may be routed through multiple assisting nodes 654, which may each forward the sidelink communication without digitally processing the sidelink communication. By utilizing the one or more assisting nodes 654, the sidelink communication from the UE 656B to the UE 656A may be amplified, extended, and avoid being obstructed.

To create the local network including network nodes (such as base stations and UEs) and assisting nodes, the assisting nodes may transmit over-the-air (OTA) discovery signals to discover each other. For example, assisting nodes may send OTA discovery signals that can be detected by monitoring assisting nodes (which may be a subset of assisting nodes). Upon detection of another assisting node, the monitoring assisting node may attempt to identify itself by sending a second OTA signal or report to a control node (that may reside on a network node) the result of its measurements. Different RATs may be used for exchanging OTA discovery signals. For example, sidelink or low-frequency communications may be used to send the OTA discovery signals. In some aspects, a discovery signal may include an assisting node's configurations, RF capabilities (e.g., transmit (Tx) power, receive (Rx) power, range, processing capability, or the like), schedule of the node, or the like. In some aspects, the discovery signal may include the assisting node's beam pattern information which may be used for interference management, positioning purposes, beam management, association, or mobility management. Beam pattern information may indicate or include a spatial coverage region of the node, the maximum amplification gain, the Tx power or effective isotropic radiated power (EIRP) in a direction, the coverage/focus distance in given directions, or the like.

In some aspects, an assisting node may be provided information about the nearby assisting nodes. The information about the nearby assisting nodes may further be used for (or facilitate) discovering or communicating with the indicated nodes, as further described in connection with FIG. 7. The information may be provided by a control node or one of the discovered assisting nodes. A control node may be a management entity in the cloud (e.g., that may communicate via a network node) or a local device (e.g., one of the assisting nodes). The information about the nearby assisting nodes may be shared during a discovery procedure or at a later stage.

In some aspects, an assisting node may establish a connection to a network node (such as a UE or a base station). The network may then decide whether to handover, re-associate the assisting node, or de-associate the assisting node. In some aspects, a network entity may become aware of the deployed assisting nodes and provide information to the network nodes that may want to use the assisting node. In some aspects, assisting nodes may send OTA discovery signals to be detected by the network node. Aspects provided herein may enable cooperative association of assisting nodes to facilitate communications.

Figure 7:
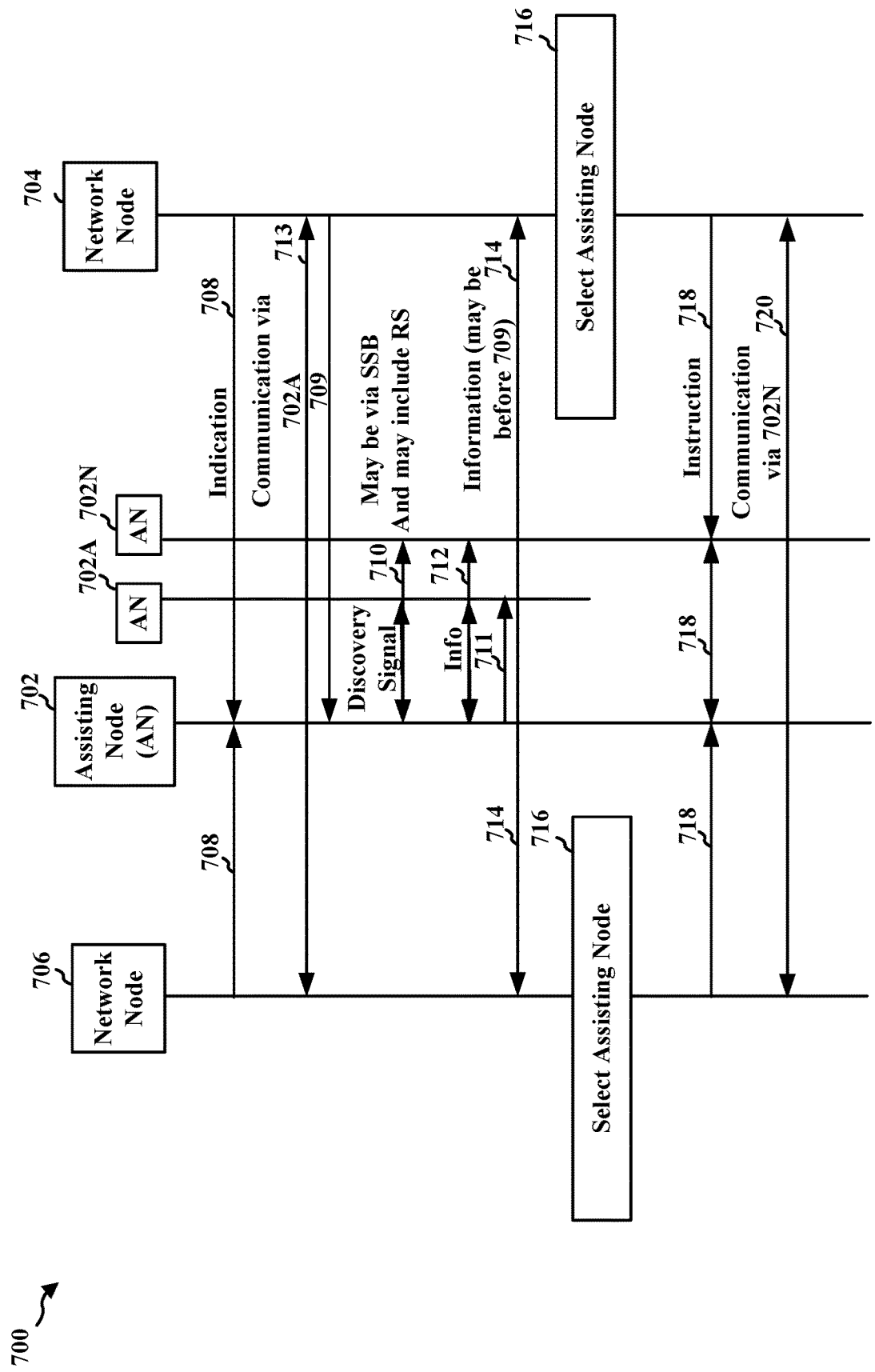
FIG. 7 is a diagram illustrating an example communication flow between network nodes and assisting nodes and assisting nodes.

FIG. 7 is a diagram 700 illustrating an example communication flow between network nodes 704 and 706 and assisting nodes 702, 702A, and 702N. The network node 704 may be a base station. The network node 706 may be a UE. The assisting node 702N may be provided as an example and more than one assisting node 702N may be included. The assisting nodes 702, 702A, and 702N may be sharing information about assisting nodes with each other. In some aspects, the assisting nodes 702, 702A, and 702N may be in communication with each other via a cooperative network that may be implemented using sidelink communication or other methods. In some aspects, the assisting nodes 702, 702A, and 702N may belong to a subset of assisting nodes that may be sending the discovery signals. There may be one or more assisting nodes, such as an assisting node of the assisting nodes 702A and 702N, or other assisting nodes, that may not transmit discovery signals.

As illustrated in FIG. 7, the assisting node 702 may receive an indication 708 from a network (e.g., the network node 706 or 704) indicating that another assisting node (e.g., the assisting node 702A) may be called to establish a connection to facilitate communications between network nodes. In some aspects, the assisting node 702 may communicate (over the cooperative network) with the target assisting node (e.g., the assisting node 702A), and provide instructions to the target assisting node (e.g., the assisting node 702A) so that the target assisting node (e.g., the assisting node 702A) may take actions accordingly. For example, in some aspects, the target assisting node (e.g., the assisting node 702A) may establish a connection with the network nodes (e.g., the network nodes 704 and 706) to forward a communication 713 between the network nodes. As another example, in some aspects, the target assisting node (e.g., the assisting node 702A) may be instructed to establish a connection with another entity or monitor for a broadcast or control signal from the network node 704 or 706.

In some aspects, an assisting node (e.g., the assisting node 702), based on its measurements or acquired information, may decide to instruct another assisting node (e.g., the assisting node 702N) to get involved instead of transmitting instructions to the target assisting node (e.g., the assisting node 702A). For example, based on information about the assisting node 702A, which may be previously transmitted to the assisting node 702 by an assisting node (which may be assisting node 702A or other assisting nodes), or transmitted to the assisting node 702 by the network (e.g., information from the network node 704), the assisting node 702 may determine to discover another assisting node (e.g., the assisting node 702N).

In some aspects, the assisting node 702 may discover the assisting node 702N by transmitting discovery signal 710. In some aspects, the assisting node 702 may discover the assisting node 702N by receiving discovery signal 710 transmitted by the assisting node 702N. In some aspects, a discovery signal may include an assisting node's configurations, RF capabilities (e.g., Tx power, Rx power, range, processing capability, or the like), the schedule of the node, or the like. In some aspects, the discovery signal may include the assisting node's beam pattern information which may be used for interference management, positioning purposes, beam management, association, or mobility management. Beam pattern information may indicate or include spatial coverage region of the node, the maximum amplification gain, Tx power or EIRP in a direction, the coverage/focus distance in given directions, or the like. In some aspects, the discovery signal 710 may include information about the assisting node 702 or the assisting node 702N.

In some aspects, assisting nodes may rotate sending discovery signals. Each assisting node may be divided into different groups, and each group may follow a pattern for sending a discovery signal or being silent. To transmit the discovery signal 710, the assisting node 702 or the assisting node 702A may follow the pattern associated with the assisting node 702 or the assisting node 702A. In some aspects, a subset of assisting nodes may be monitoring for discovery signals and the subset may be configured by a network node or another control entity.

In some aspects, the discovery signal 710, and other discovery signals, may be transmitted via SSBs or sidelink SSBs. In some aspects, neighboring assisting nodes (e.g., that are part of the same group as the assisting node 702 or the assisting node 702A) may send the same SSB (e.g., same identifier) to effectively create a local network (e.g., a single frequency network). Such an SFN may improve the access performance and efficiency. In some aspects, a reference signal (RS) may be transmitted along with the SSB. The RS may occupy the unused resource elements (REs) that may be frequency division multiplexed (FDMed) with a primary synchronization signal (PSS).

In some aspects, the assisting node 702 may transmit information 714 about one or more assisting nodes, such as one or more of the assisting nodes 702, 702A, and 702N, to the network node, such as the network node 704 or the network node 706. The network node 704 or 706 may accordingly transmit an instruction 709 to discover an assisting node, or select an assisting node (e.g., at 716) and accordingly transmit an instruction 718 to instruct the selected assisting node to establish a connection with an indicated network node or monitor for a control signal. The instruction 718 may be forwarded to a selected assisting node after being first transmitted to another assisting node. In some aspects, the assisting node 702N may be selected by the assisting node 702 or the network node 704 or 706. As one example, the assisting node 702N may accordingly receive an instruction to facilitate communication 720 between the network node 706 and the network node 704.

Figure 8:
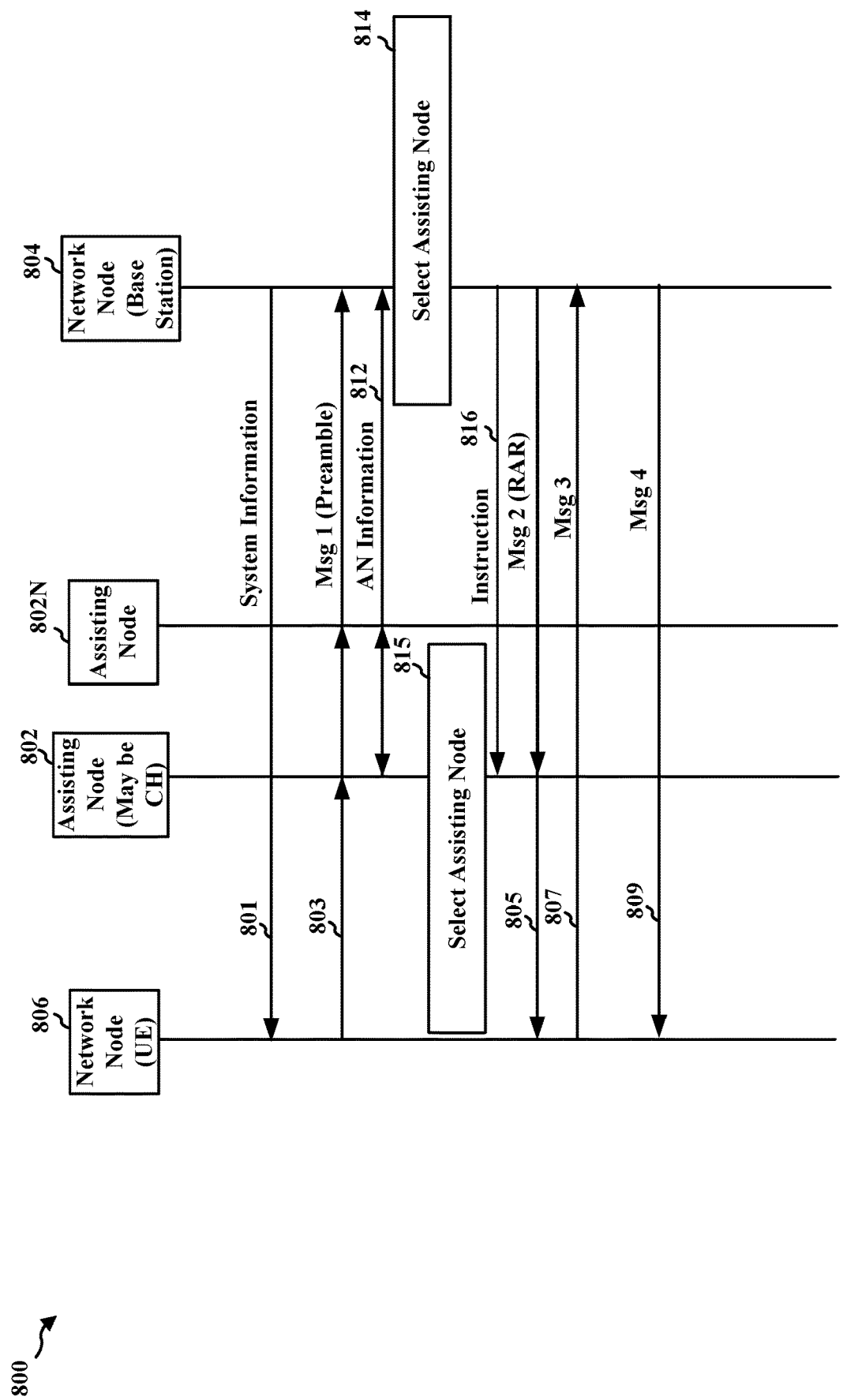
FIG. 8 is a diagram illustrating an example communication flow between network nodes and assisting nodes and assisting nodes.

FIG. 8 is a diagram 800 illustrating an example communication flow between network nodes and assisting nodes. The network node 804 may be a base station. The network node 806 may be a UE. The assisting node 802N may be provided as an example and more than one assisting node 802N may be included. The assisting nodes 802 and 802N may be sharing information about assisting nodes with each other. In some aspects, the assisting nodes 802 and 802N may be in communication with each other via a cooperative network that may be implemented using sidelink communication or other methods. The network node 804 (e.g., a base station) may be a DU and the assisting nodes 802 and 802N may be RUs. In some aspects, each of the assisting nodes 802 and 802N may generate and transmit SSBs (with a same identifier or different identifiers) and RMSI following a configured schedule, such as an ON-OFF pattern, an omni-beam, or the like.

The network node 806 (e.g., a UE) may initiate the random access message exchange by sending, to the network node 804, a first random access message 803 (e.g., message 1 (Msg 1)) including a RACH preamble. Prior to sending the first random access message 803, the UE may obtain random access parameters (which may be otherwise referred to as PRACH configurations), e.g., including RACH preamble format parameters, PRACH resources (in the form of time and frequency), parameters for determining root sequences and/or cyclic shifts for a RACH preamble, etc., e.g., in system information 801 from the network node 804. The RACH preamble may be transmitted with an identifier, such as a random access RNTI (RA-RNTI). The network node 806 may randomly select a RACH preamble sequence, e.g., from a set of RACH preamble sequences corresponding to the preamble formats. If network node UE 806 randomly selects the RACH preamble sequence, the network node 804 may receive another RACH preamble from a different UE at the same time. In some examples, a RACH preamble sequence may be assigned to the network node 806.

In some aspects, each of the assisting nodes 802 and 802N may monitor for a RACH preamble, such as a RACH preamble in the first random access message 803. A first set of the assisting nodes 802 and 802N may detect a RACH preamble in the first random access message 803 transmitted by the network node 806. In some aspects, a first subset of the first set of the assisting nodes 802 and 802N (e.g., the assisting node 802) may be selected by the network node 804 (at 814) to communicate following Msg 2, Msg 3, and Msg 4 with the network node 806. In some aspects, multiple assisting nodes may be configured to send their SSBs (possibly towards different directions) on a same SSB location, and monitor for a RACH preamble on a same RO to reduce a system resource overhead, interference, and/or UE power consumption. In some aspects, the set of assisting nodes sending SSBs and the set of assisting nodes monitoring for ROs may not be the same. For example, fewer assisting nodes may transmit SSBs compared to the assisting nodes monitoring for ROs. In some aspects, all assisting nodes may detect a RACH preamble and become a candidate for selection to forward Msg 2, Msg 3, and Msg 4.

In some aspects, information 812 regarding one or more assisting nodes may be transmitted to the network node 804. In some aspects, candidate assisting nodes 802/802N that may be selected to facilitate communication of Msg 2, Msg 3, and Msg 4 may be prepared for the next RACH messages. In some aspects, the candidate assisting nodes 802/802N may be selected by a cluster head which may be the assisting node 802 or another entity based on information regarding the assisting nodes 802/802N. In some aspects, the candidate repeaters may be in communication with a cluster head, and the cluster head may send a request (e.g., a RACH detection report) to a DU (e.g., the network node 804). In some aspects, the candidate assisting nodes 802/802N may transmit a request (e.g., a RACH detection report) to a DU (e.g., the network node 804). In some aspects, the network node 804 may perform a sub-selection, at 814, if multiple assisting nodes of the assisting nodes 802/802N declare that the assisting node detected a RACH Msg 1 (e.g., associated with 803) with the same ID on the same RO. In some aspects, the sub-selection at 814 may be based on information regarding the one or more assisting nodes (e.g., which may be included in the information 812) such as reported received power, UL timing, or other considerations such as power consumption of the assisting node, interference to other nodes, or the like. In some aspects, the network node 804 may provide instruction 816 to selected assisting nodes to establish a connection to facilitate the communication of Msg 2, Msg 3, or Msg 4.

In some aspects, the cluster head may also perform a similar sub-selection at 815. In some aspects, the cluster head may transmit a consolidated report to the DU including which assisting node detected the RACH and associated measurement metrics. In some aspects, the cluster head may be provided (e.g., by the network node 804) with selection reporting criteria associated with the one or more assisting nodes 802/802N.

The base station may respond to the first random access message 803 by sending a second random access message 805 (e.g., Msg 2) (via the selected assisting node of the assisting nodes 802/802N) using a PDSCH and including a random access response (RAR). The RAR may include, e.g., an identifier of the RACH preamble sent by the UE, a time advance (TA), an uplink grant for the UE to transmit data, a cell radio network temporary identifier (C-RNTI) or other identifier, and/or a back-off indicator. Upon receiving the RAR (e.g., 805), the network node 806 may transmit a third random access message 807 (e.g., Msg 3) (via the selected assisting node of the assisting nodes 802/802N) to the network node 804, e.g., using a PUSCH, that may include an RRC connection request, an RRC connection re-establishment request, or an RRC connection resume request, depending on the trigger for the initiating the random access procedure. The network node 804 may then complete the random access procedure by sending a fourth random access message 809 (e.g., Msg 4) (via the selected assisting node of the assisting nodes 802/802N) to the network node 806, e.g., using a PDCCH for scheduling and a PDSCH for the message. The fourth random access message 809 may include a random access response message that includes timing advancement information, contention resolution information, and/or RRC connection setup information. The network node 806 (e.g., a UE) may monitor for a PDCCH, e.g., with the C-RNTI. If the PDCCH is successfully decoded, the network node 806 may also decode a PDSCH. The network node 806 may send HARQ feedback for any data carried in the fourth random access message. If two UEs sent a same RACH preamble at 803, both UEs may receive the RAR causing both UEs to send a third random access message 807. The network node 804 may resolve such a collision by being able to decode the third random access message from one of the UEs and responding with a fourth random access message to that UE. The other UE, which did not receive the fourth random access message 809, may determine that random access did not succeed and may re-attempt random access. Thus, the fourth message may be referred to as a contention resolution message. The fourth random access message 809 may complete the random access procedure. Thus, the network node 806 (e.g., a UE) may then transmit uplink communication and/or receive downlink communication with the network node 804 based on the RAR (e.g., 805).

Figure 9:
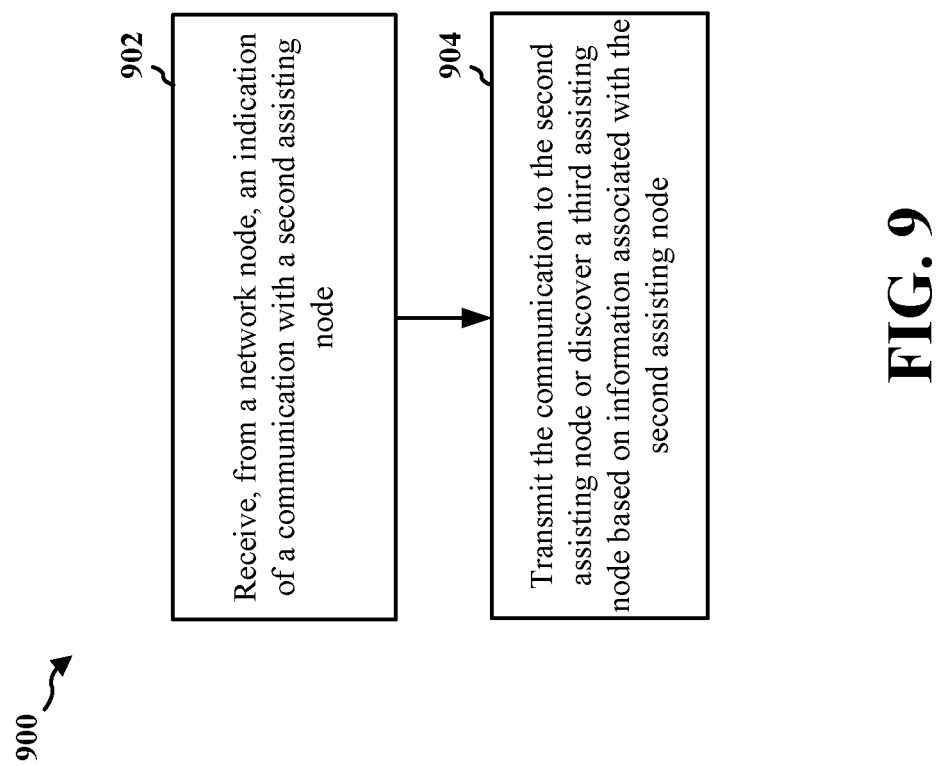
FIG. 9 is a flowchart of a method of wireless communication.

FIG. 9 is a flowchart 900 of a method of wireless communication. The method may be performed by an assisting node (e.g., the assisting node 179, the assisting node 506, the assisting node 604, the assisting node 654, the assisting node 702/702N, the assisting node 802/802N; the apparatus 1202).

At 902, the assisting node may receive, from a network node, an indication of a communication with a second assisting node. For example, the assisting node 702 may receive, from a network node 704 or 706, an indication 708 of a communication with a second assisting node 702A. In some aspects, 902 may be performed by assisting component 1242 in FIG. 12.

At 904, the assisting node may transmit the communication to the second assisting node or discover a third assisting node based on information associated with the second assisting node. For example, the assisting node 702 may transmit the communication 711 to the second assisting node or discover a third assisting node 702N based on information (e.g., 712) associated with the second assisting node 702A. In some aspects, 904 may be performed by assisting component 1242 in FIG. 12.

Figure 10:
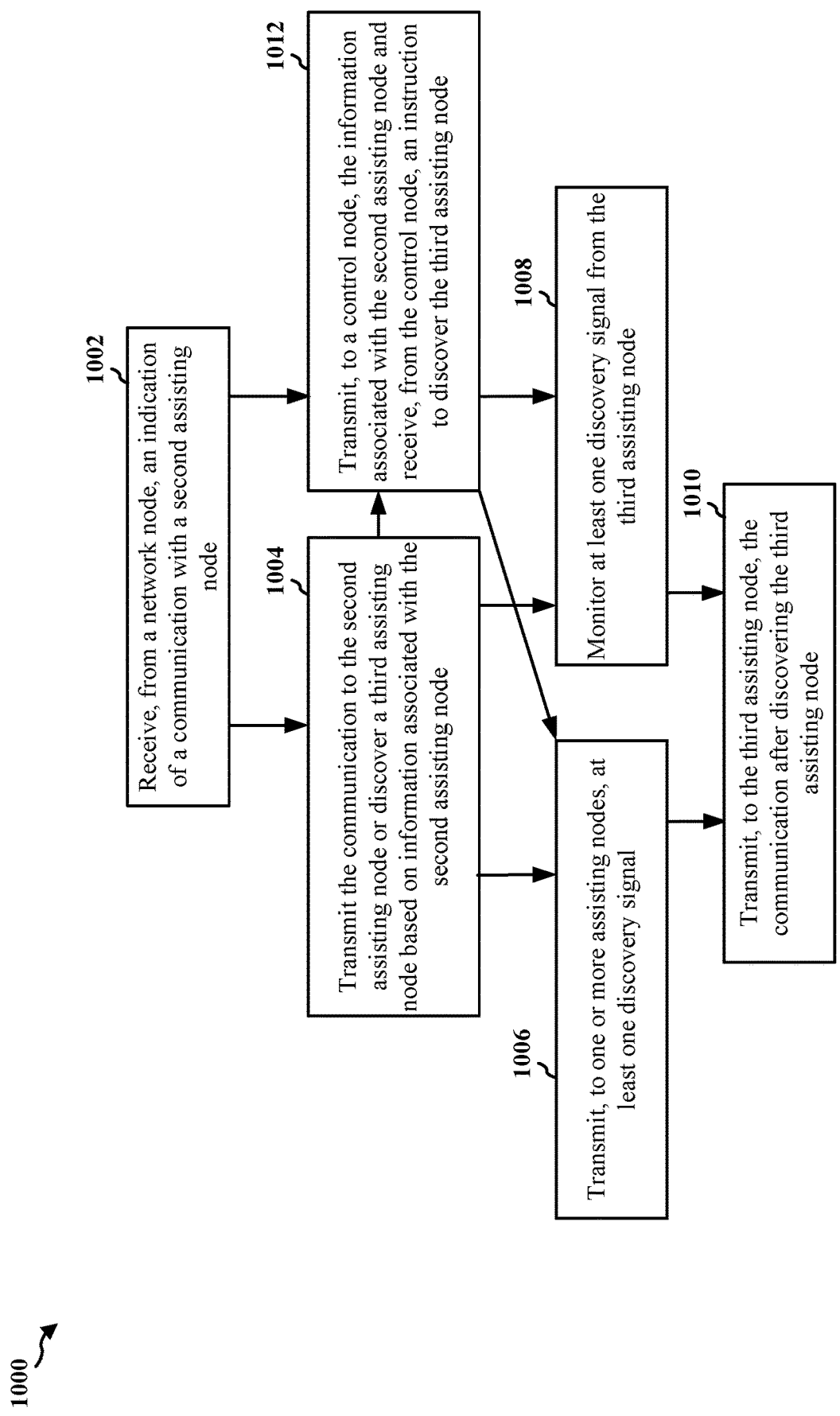
FIG. 10 is a flowchart of a method of wireless communication.

FIG. 10 is a flowchart 1000 of a method of wireless communication. The method may be performed by an assisting node (e.g., the assisting node 179, the assisting node 506, the assisting node 604, the assisting node 654, the assisting node 702/702N, the assisting node 802/802N; the apparatus 1202).

At 1002, the assisting node may receive, from a network node, an indication of a communication with a second assisting node. For example, the assisting node 702 may receive, from a network node 704 or 706, an indication 708 of a communication with a second assisting node 702A. In some aspects, 1002 may be performed by assisting component 1242 in FIG. 12.

At 1004, the assisting node may transmit the communication to the second assisting node or discover a third assisting node based on information associated with the second assisting node. For example, the assisting node 702 may transmit the communication 711 to the second assisting node or discover a third assisting node 702N based on information (e.g., 712) associated with the second assisting node 702A. In some aspects, 1004 may be performed by assisting component 1242 in FIG. 12. In some aspects, the information may be received from the second assisting node (e.g., the information 712).

At 1006, the assisting node may transmit, to one or more assisting nodes, at least one discovery signal. The one or more assisting nodes may include the third assisting node. For example, the assisting node 702 may transmit, to one or more assisting nodes, at least one discovery signal 710. The one or more assisting nodes may include the third assisting node 702N. In some aspects, 1006 may be performed by assisting component 1242 in FIG. 12. In some aspects, the at least one discovery signal may include beam pattern information including one or more of: a spatial coverage region associated with the first assisting node, a maximum amplification gain associated with the first assisting node, a transmit power associated with the first assisting node, a focus distance associated with the first assisting node, or an effective isotropic radiated power associated with the first assisting node. In some aspects, the at least one discovery signal may be transmitted in a time window associated with the first assisting node. In some aspects, the time window may be associated with a group of assisting nodes including the first assisting node. In some aspects, the time window may be defined based on a pattern associated with the group of assisting nodes including the first assisting node. In some aspects, the at least one discovery signal may include one or more SSBs. In some aspects, the one or more SSBs may be identical to a set of SSBs transmitted by one or more neighboring assisting nodes of the first assisting node. In some aspects, one or more neighboring assisting nodes and the first assisting node form an SFN. In some aspects, the one or more SSBs may be transmitted with a RS. In some aspects, the RS may occupy one or more unused REs that are FDM'ed with a PSS. In some aspects, the one or more SSBs and the set of SSBs may be associated with a same SSB location. In some aspects, the first assisting node and the one or more neighboring assisting nodes are configured to monitor for a same RO.

At 1008, the assisting node may monitor at least one discovery signal from the third assisting node. For example, the assisting node 702 may monitor at least one discovery signal 710 from the third assisting node 702N. In some aspects, 1008 may be performed by assisting component 1242 in FIG. 12. In some aspects, the at least one discovery signal may include beam pattern information including one or more of: a spatial coverage region associated with the third assisting node, a maximum amplification gain associated with the third assisting node, a transmit power associated with the third assisting node, a focus distance associated with the third assisting node, or an effective isotropic radiated power associated with the third assisting node.

At 1010, the assisting node may transmit, to the third assisting node, the communication after discovering the third assisting node. For example, the assisting node 702 may transmit, to the third assisting node 702N, the communication (e.g., instruction 718) after discovering the third assisting node 702N. In some aspects, 1010 may be performed by assisting component 1242 in FIG. 12. In some aspects, the communication may include an instruction to establish a connection. In some aspects, the communication may include an instruction to monitor for a broadcast associated with the network node. In some aspects, the communication may include an instruction to monitor for a control signal associated with the network node. In some aspects, the information may be based on at least one measurement of the second assisting node, such as based on the second assisting node being not suitable.

At 1012, the assisting node may transmit, to a control node, the information associated with the second assisting node and receive, from the control node, an instruction to discover the third assisting node. For example, the assisting node 702 may transmit, to a control node (e.g., the network node 704 or 706), the information 714 associated with the second assisting node 702A and receive, from the control node (e.g., the network node 704 or 706), an instruction 709 to discover the third assisting node (e.g., 702N). In some aspects, 1012 may be performed by assisting component 1242 in FIG. 12. In some aspects, the control node may be located at the network node.

Figure 11:
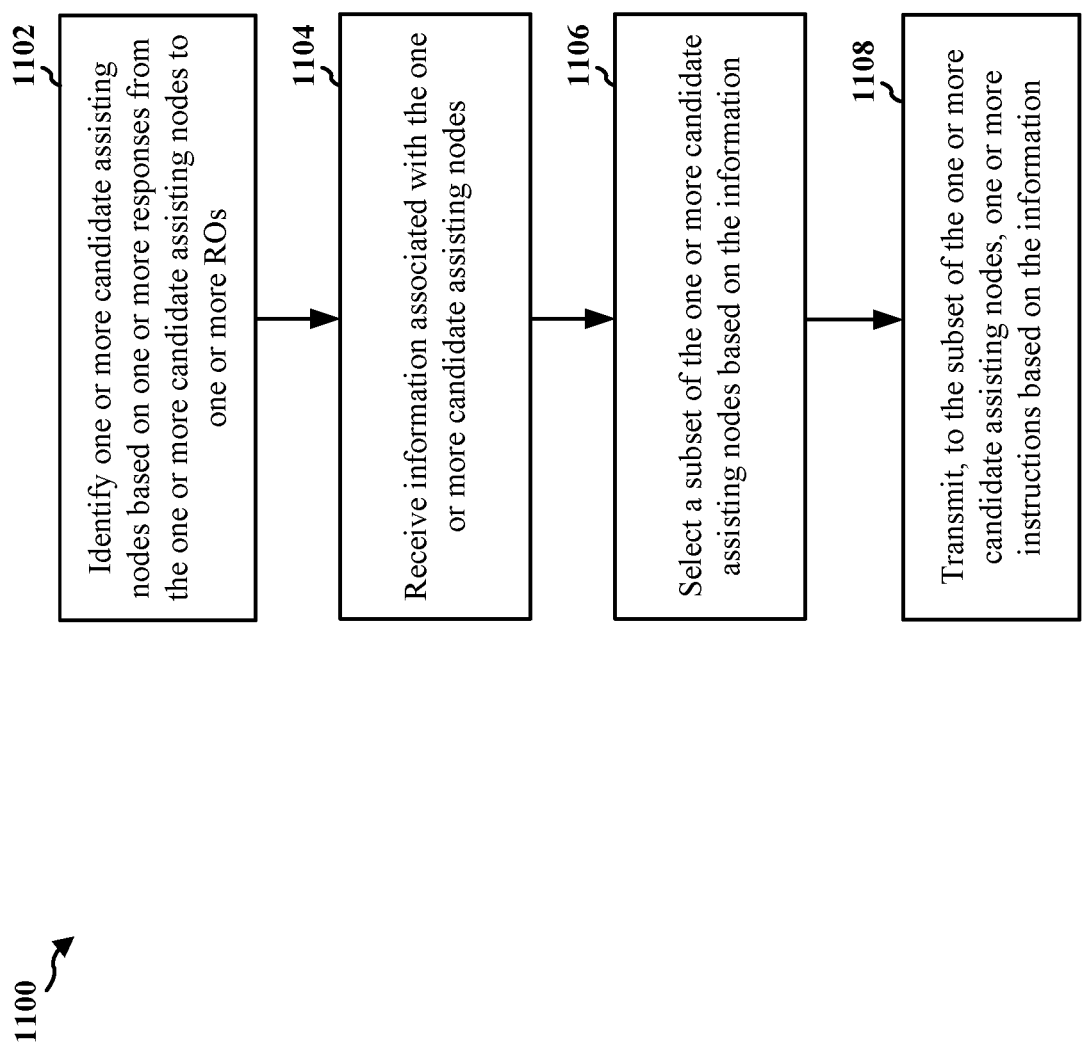
FIG. 11 is a flowchart of a method of wireless communication.

FIG. 11 is a flowchart 1100 of a method of wireless communication. The method may be performed by network node, such as a UE or a base station (e.g., the UE 104, the base station 102/180, the UE 504, the base station 502, the base station 602, the UE 606, the UE 656A/B, the network node 704/706, the network node 804/806; the apparatus 1302).

At 1102, the network node may identify one or more candidate assisting nodes based on one or more responses from the one or more candidate assisting nodes to one or more ROs. For example, the network node 804 may identify one or more candidate assisting nodes (e.g., assisting nodes 802/802N) based on one or more responses from the one or more candidate assisting nodes to one or more ROs. In some aspects, 1102 may be performed by assisting component 1342 in FIG. 13.

At 1104, the network node may receive information associated with the one or more candidate assisting nodes. For example, the network node 804 may receive information (e.g., information 812) associated with the one or more candidate assisting nodes (e.g., assisting nodes 802/802N). The information may be received from one or more of the assisting nodes 802/802N. In some aspects, 1104 may be performed by assisting component 1342 in FIG. 13. In some aspects, the information may include one or more of: a reported receive power, an uplink timing, an interference, or a power consumption.

At 1106, the network node may select a subset of the one or more candidate assisting nodes based on the information. For example, the network node 804 may select a subset of the one or more candidate assisting nodes (e.g., select the assisting node 802 among assisting nodes 802/802N at 814) based on the information. In some aspects, 1106 may be performed by assisting component 1342 in FIG. 13. In some aspects, the network node may include a CH. In some aspects, the assisting node 802 may be the CH.

At 1108, the network node may transmit, to the subset of the one or more candidate assisting nodes, one or more instructions based on the information. For example, the network node 804 may transmit, to the subset of the one or more candidate assisting nodes (e.g., the assisting node 802), one or more instructions (e.g., instruction 816) based on the information. In some aspects, 1108 may be performed by assisting component 1342 in FIG. 13.

Figure 12:
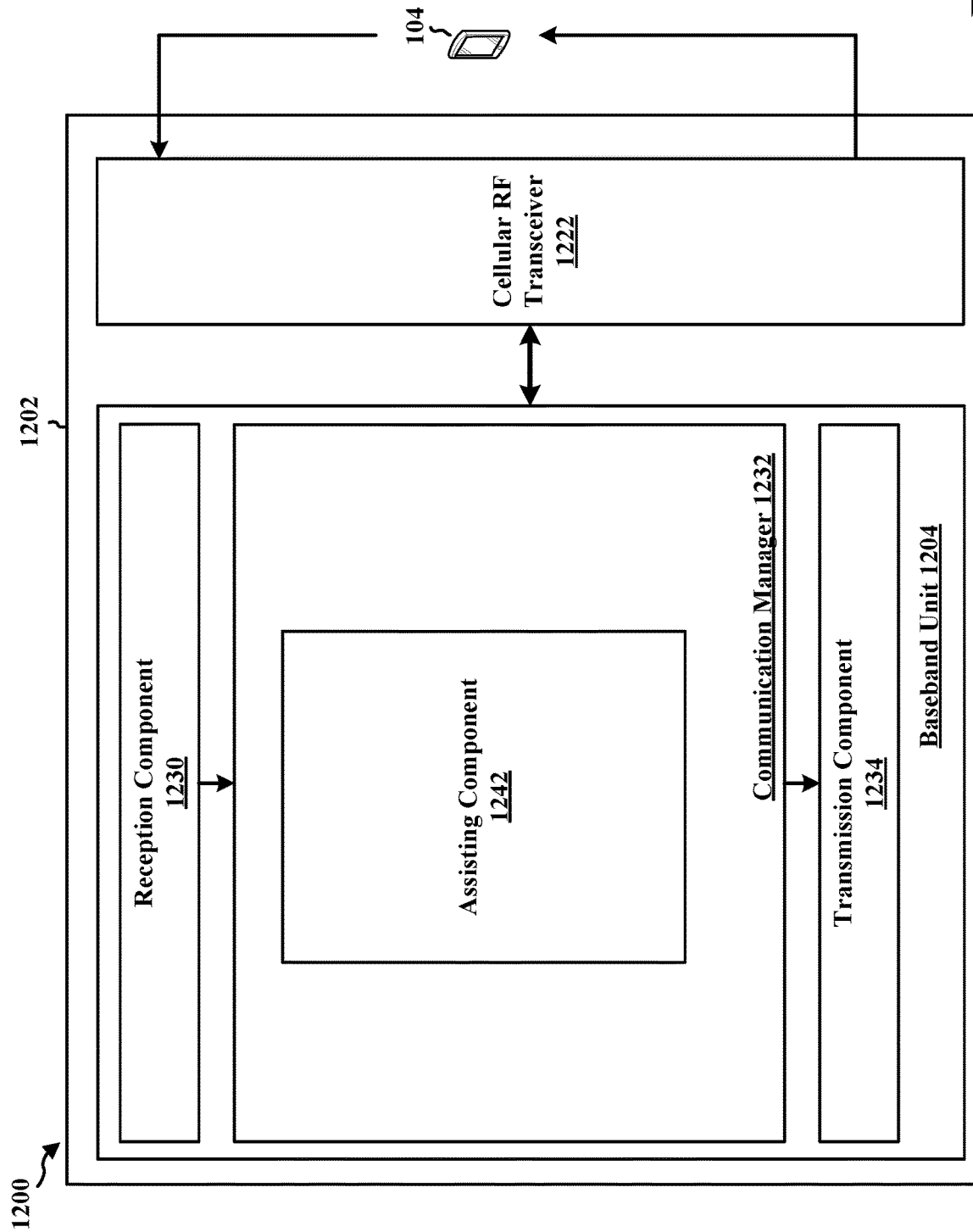
FIG. 12 is a diagram illustrating an example of a hardware implementation for an example apparatus.

FIG. 12 is a diagram 1200 illustrating an example of a hardware implementation for an apparatus 1202. The apparatus 1202 may be an assisting node, a component of an assisting node, or may implement assisting node functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include an assisting component 1242 that may receive, from a network node, an indication of a communication with a second assisting node and transmit the communication to the second assisting node or discover a third assisting node based on information associated with the second assisting node, e.g., as described in connection with 902 or 904 in FIG. 9, or 1002 or 1004 in FIG. 10. In some aspects, the assisting component 1242 may be further configured to transmit, to one or more assisting nodes, at least one discovery signal, e.g., as described in connection with 1006 in FIG. 10. In some aspects, the assisting component 1242 may be further configured to monitor at least one discovery signal from the third assisting node, e.g., as described in connection with 1008 in FIG. 10. In some aspects, the assisting component 1242 may be further configured to transmit, to the third assisting node, the communication after discovering the third assisting node, e.g., as described in connection with 1010 in FIG. 10. In some aspects, the assisting component 1242 may be further configured to transmit, to a control node, the information associated with the second assisting node and receive, from the control node, an instruction to discover the third assisting node, e.g., as described in connection with 1012 in FIG. 10.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
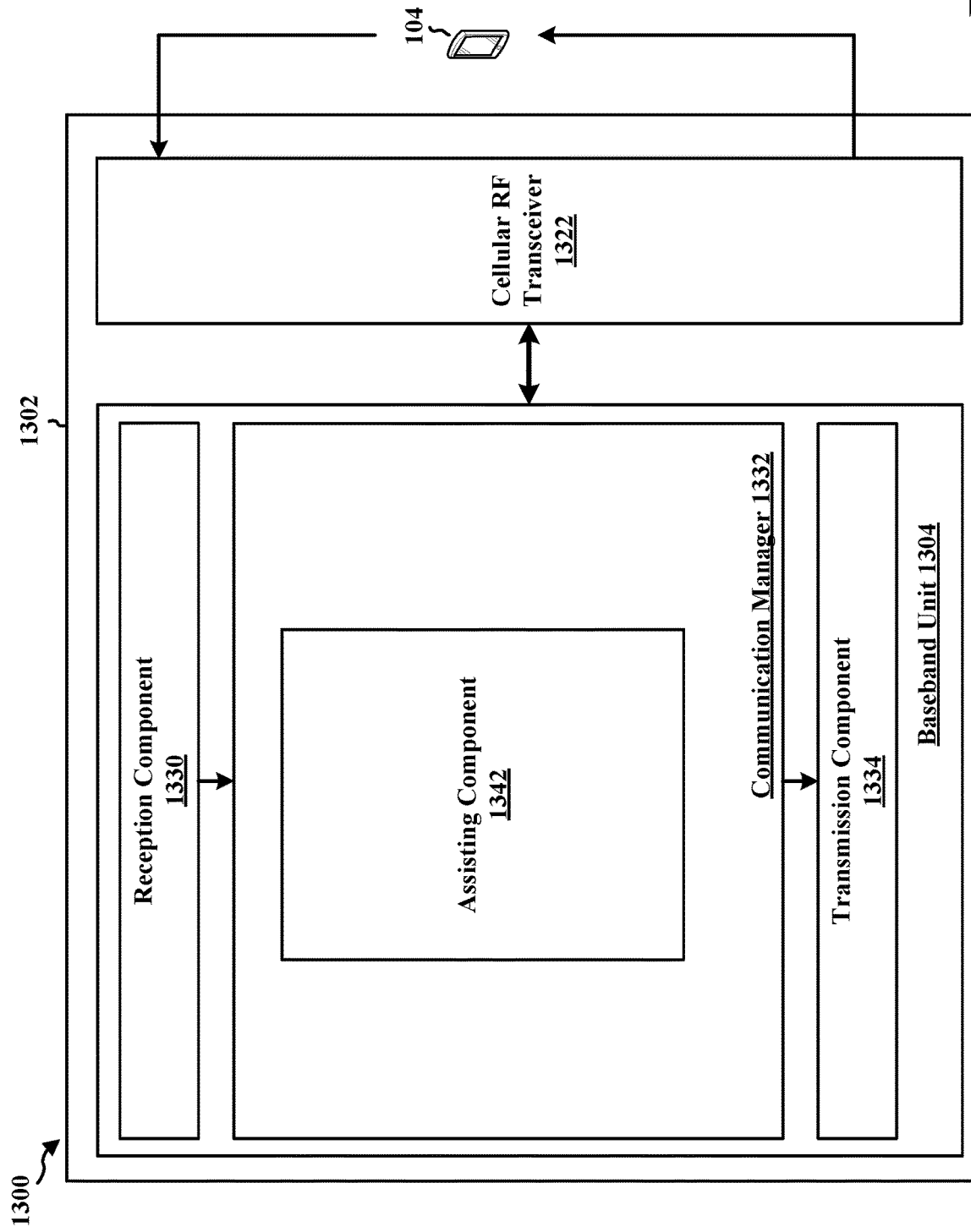
FIG. 13 is a diagram illustrating an example of a hardware implementation for an example apparatus.

As shown, the apparatus 1202 may include a variety of components configured for various functions. In one configuration, the apparatus 1202, and in particular the baseband unit 1204, may include means for receiving, from a network node, an indication of a communication with a second assisting node. The baseband unit 1204 may further include means for transmitting the communication to the second assisting node or discovering a third assisting node based on information associated with the second assisting node. The baseband unit 1204 may further include means for transmitting, to one or more assisting nodes, at least one discovery signal. The baseband unit 1204 may further include means for monitoring at least one discovery signal from the third assisting node. The baseband unit 1204 may further include means for transmitting, to the third assisting node, the communication after discovering the third assisting node. The baseband unit 1204 may further include means for transmitting, to a control node, the information associated with the second assisting node. The baseband unit 1204 may further include means for receiving, from the control node, an instruction to discover the third assisting node. The baseband unit 1204 may further include means for transmitting, to one or more assisting nodes, at least one discovery signal. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means. FIG. 13 is a diagram 1300 illustrating an example of a hardware implementation for an apparatus 1302. The apparatus 1302 may be a base station or a UE, a component of a base station or a UE, or may implement base station or UE functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 may include an assisting component 1342 that may identify one or more candidate assisting nodes based on one or more responses from the one or more candidate assisting nodes to one or more ROs, e.g., as described in connection with 1102 in FIG. 11. In some aspects, the assisting component 1342 may be further configured to receive information associated with the one or more candidate assisting nodes, e.g., as described in connection with 1104 in FIG. 11. In some aspects, the assisting component 1342 may be further configured to select a subset of the one or more candidate assisting nodes based on the information, e.g., as described in connection with 1106 in FIG. 11. In some aspects, the assisting component 1342 may be further configured to transmit, to the subset of the one or more candidate assisting nodes, one or more instructions based on the information, e.g., as described in connection with 1108 in FIG. 11.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, may include means for identifying one or more candidate assisting nodes based on one or more responses from the one or more candidate assisting nodes to one or more ROs. The baseband unit 1304 may further include means for receiving information associated with the one or more candidate assisting nodes. The baseband unit 1304 may further include means for selecting a subset of the one or more candidate assisting nodes based on the information. The baseband unit 1304 may further include means for transmitting, to the subset of the one or more candidate assisting nodes, one or more instructions based on the information. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects provided herein facilitate more efficient assisting node operations by providing mechanisms for assisting nodes to discover each other and establishing connections with reduced central management.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first assisting node, comprising: a memory; and at least one processor coupled to the memory and configured to: receive, from a network node, an indication of a communication with a second assisting node; and transmit the communication to the second assisting node or discover a third assisting node based on information associated with the second assisting node.

Aspect 2 is the apparatus of aspect 1, wherein to discover the third assisting node, the at least one processor coupled to the memory is further configured to: transmit, to one or more assisting nodes, at least one discovery signal, wherein the one or more assisting nodes include the third assisting node.

Aspect 3 is the apparatus of any of aspects 1-2, wherein the at least one discovery signal includes beam pattern information including one or more of: a spatial coverage region associated with the first assisting node, a maximum amplification gain associated with the first assisting node, a transmit power associated with the first assisting node, a focus distance associated with the first assisting node, or an effective isotropic radiated power associated with the first assisting node.

Aspect 4 is the apparatus of any of aspects 1-3, wherein to discover the third assisting node, the at least one processor coupled to the memory is further configured to: monitor at least one discovery signal from the third assisting node.

Aspect 5 is the apparatus of any of aspects 1-4, wherein the at least one discovery signal includes beam pattern information including one or more of: a spatial coverage region associated with the third assisting node, a maximum amplification gain associated with the third assisting node, a transmit power associated with the third assisting node, a focus distance associated with the third assisting node, or an effective isotropic radiated power associated with the third assisting node.

Aspect 6 is the apparatus of any of aspects 1-5, wherein the at least one processor coupled to the memory is further configured to: transmit, to the third assisting node, the communication after discovering the third assisting node.

Aspect 7 is the apparatus of any of aspects 1-6, wherein the communication includes an instruction to establish a connection.

Aspect 8 is the apparatus of any of aspects 1-7, wherein the communication includes an instruction to monitor for a broadcast associated with the network node.

Aspect 9 is the apparatus of any of aspects 1-8, wherein the communication includes an instruction to monitor for a control signal associated with the network node.

Aspect 10 is the apparatus of any of aspects 1-9, wherein the information is based on at least one measurement of the second assisting node.

Aspect 11 is the apparatus of any of aspects 1-10, wherein the information is received from the second assisting node.

Aspect 12 is the apparatus of any of aspects 1-11, wherein the at least one processor coupled to the memory is further configured to: transmit, to a control node, the information associated with the second assisting node.

Aspect 13 is the apparatus of any of aspects 1-12, wherein the at least one processor coupled to the memory is further configured to: receive, from the control node, an instruction to discover the third assisting node.

Aspect 14 is the apparatus of any of aspects 1-13, wherein the control node is located at the network node.

Aspect 15 is the apparatus of any of aspects 1-4, wherein to discover the third assisting node, the at least one processor coupled to the memory is further configured to: transmit, to one or more assisting nodes, at least one discovery signal, wherein the one or more assisting nodes include the third assisting node, and wherein the at least one discovery signal is transmitted in a time window associated with the first assisting node.

Aspect 16 is the apparatus of any of aspects 1-15, wherein the time window is associated with a group of assisting nodes including the first assisting node.

Aspect 17 is the apparatus of any of aspects 1-16, wherein the time window is defined based on a pattern associated with the group of assisting nodes including the first assisting node.

Aspect 18 is the apparatus of any of aspects 1-17, wherein the at least one discovery signal includes one or more SSBs.

Aspect 19 is the apparatus of any of aspects 1-18, wherein the one or more SSBs are identical to a set of SSBs transmitted by one or more neighboring assisting nodes of the first assisting node, and wherein the one or more neighboring assisting nodes and the first assisting node form a SFN.

Aspect 20 is the apparatus of any of aspects 1-19, wherein the one or more SSBs are transmitted with a RS.

Aspect 21 is the apparatus of any of aspects 1-20, wherein the RS occupies one or more unused REs that are FDM'ed with a PSS.

Aspect 22 is the apparatus of any of aspects 1-21, wherein the one or more SSBs and the set of SSBs are associated with a same SSB location.

Aspect 23 is the apparatus of any of aspects 1-22, wherein the first assisting node and the one or more neighboring assisting nodes are configured to monitor for a same RO.

Aspect 24 is the apparatus of any of aspects 1-23, further comprising a transceiver coupled to the at least one processor.

Aspect 25 is an apparatus for wireless communication at a network node, comprising: a memory; and at least one processor coupled to the memory and configured to: identify one or more candidate assisting nodes based on one or more responses from the one or more candidate assisting nodes to one or more ROs; receive information associated with the one or more candidate assisting nodes; select a subset of the one or more candidate assisting nodes based on the information; and transmit, to the subset of the one or more candidate assisting nodes, one or more instructions based on the information.

Aspect 26 is the apparatus of aspect 25 wherein the information includes one or more of: a reported receive power, an uplink timing, an interference, or a power consumption.

Aspect 27 is the apparatus of any of aspects 25-26, wherein the network node includes a CH.

Aspect 28 is the apparatus of any of aspects 25-27, further comprising a transceiver coupled to the at least one processor.

Aspect 29 is a method of wireless communication for implementing any of aspects 1 to 24.

Aspect 30 is an apparatus for wireless communication including means for implementing any of aspects 1 to 24.

Aspect 31 is a computer-readable medium storing computer executable code, where the code when executed by a processor causes the processor to implement any of aspects 1 to 24.

Aspect 32 is a method of wireless communication for implementing any of aspects 25 to 28.

Aspect 33 is an apparatus for wireless communication including means for implementing any of aspects 25 to 28.

Aspect 34 is a computer-readable medium storing computer executable code, where the code when executed by a processor causes the processor to implement any of aspects 25 to 28.

What is claimed is:

1. An apparatus for wireless communication at a first assisting node, comprising:
   memory; and
   at least one processor coupled to the memory and configured to:
      receive, from a network node, an indication of a communication with a second assisting node; and
      discover a third assisting node based on information associated with the second assisting node, and wherein to discover the third assisting node, the at least one processor coupled to the memory is configured to transmit, to one or more assisting nodes, at least one discovery signal in a time window associated with the first assisting node, wherein
         the one or more assisting nodes include the third assisting node,
         the at least one discovery signal includes one or more synchronization signal blocks (SSBs),
         the one or more SSBs are identical to a set of SSBs associated with one or more neighboring assisting nodes of the first assisting node, and
         the one or more neighboring assisting nodes and the first assisting node form a single frequency network (SFN).

2. The apparatus of claim 1, wherein the at least one discovery signal includes beam pattern information including one or more of: a spatial coverage region associated with the first assisting node, a maximum amplification gain associated with the first assisting node, a transmit power associated with the first assisting node, a focus distance associated with the first assisting node, or an effective isotropic radiated power associated with the first assisting node.

3. The apparatus of claim 1, wherein to discover the third assisting node, the at least one processor coupled to the memory is further configured to:
   monitor at least one other discovery signal from the third assisting node.

4. The apparatus of claim 3, wherein the at least one other discovery signal includes beam pattern information including one or more of: a spatial coverage region associated with the third assisting node, a maximum amplification gain associated with the third assisting node, a transmit power associated with the third assisting node, a focus distance associated with the third assisting node, or an effective isotropic radiated power associated with the third assisting node.

5. The apparatus of claim 1, wherein the at least one processor coupled to the memory is further configured to:
   transmit, to the third assisting node, the communication after discovering the third assisting node.

6. The apparatus of claim 1, wherein the communication includes an instruction to establish a connection.

7. The apparatus of claim 1, wherein the communication includes an instruction to monitor for a broadcast associated with the network node.

8. The apparatus of claim 1, wherein the communication includes an instruction to monitor for a control signal associated with the network node.

9. The apparatus of claim 1, wherein the information is based on at least one measurement of the second assisting node.

10. The apparatus of claim 1, wherein the at least one processor coupled to the memory is further configured to: receive the information from the second assisting node.

11. The apparatus of claim 1, wherein the at least one processor coupled to the memory is further configured to:
    transmit, to a control node, the information associated with the second assisting node.

12. The apparatus of claim 11, wherein the at least one processor coupled to the memory is further configured to:
    receive, from the control node, an instruction to discover the third assisting node.

13. The apparatus of claim 11, wherein the control node is located at the network node.

14. The apparatus of claim 1, wherein the time window is associated with a group of assisting nodes including the first assisting node.

15. The apparatus of claim 14, wherein the time window is defined based on a pattern associated with the group of assisting nodes including the first assisting node.

16. The apparatus of claim 1, wherein the set of SSBs is transmitted by the one or more neighboring assisting nodes of the first assisting node.

17. The apparatus of claim 16, wherein the one or more SSBs are associated with a reference signal (RS).

18. The apparatus of claim 17, wherein the RS occupies one or more unused resource elements (REs) that are frequency division multiplexed (FDM'ed) with a primary synchronization signal (PSS).

19. The apparatus of claim 16, wherein the one or more SSBs and the set of SSBs are associated with a same SSB location.

20. The apparatus of claim 16, wherein the first assisting node and the one or more neighboring assisting nodes are configured to monitor for a same random access channel (RACH) occasion (RO).

21. The apparatus of claim 1, further comprising a transceiver coupled to the at least one processor.

22. An apparatus for wireless communication at a network node, comprising:
- memory; and
- at least one processor coupled to the memory and configured to:
  - identify one or more candidate assisting nodes based on one or more responses from the one or more candidate assisting nodes to one or more random access channel (RACH) occasions (ROs);
  - receive information associated with the one or more candidate assisting nodes;
  - select a subset of the one or more candidate assisting nodes based on the information; and
  - transmit, to the subset of the one or more candidate assisting nodes, one or more instructions based on the information, wherein the one or more instructions configure the subset of the one or more candidate assisting nodes to form a single frequency network (SFN), and wherein the one or more instructions configure the subset of the one or more candidate assisting nodes to use a same set of synchronization signal blocks (SSBs) as a discovery signal.

23. The apparatus of claim 22 wherein the information includes one or more of: a reported receive power, an uplink timing, an interference, or a power consumption.

24. The apparatus of claim 22, wherein the network node includes a cluster head (CH).

25. The apparatus of claim 22, further comprising a transceiver coupled to the at least one processor.

26. A method for wireless communication at a first assisting node, comprising:
- receiving, from a network node, an indication of a communication with a second assisting node; and
- discovering a third assisting node based on information associated with the second assisting node based on transmitting, to one or more assisting nodes, at least one discovery signal in a time window associated with the first assisting node, wherein
  - the one or more assisting nodes include the third assisting node,
  - the at least one discovery signal includes one or more synchronization signal blocks (SSBs),
  - the one or more SSBs are identical to a set of SSBs associated with one or more neighboring assisting nodes of the first assisting node, and
  - the one or more neighboring assisting nodes and the first assisting node form a single frequency network (SFN).

27. A method for wireless communication at a network node, comprising:
- identifying one or more candidate assisting nodes based on one or more responses from the one or more candidate assisting nodes to one or more random access channel (RACH) occasions (ROs);
- receiving information associated with the one or more candidate assisting nodes;
- selecting a subset of the one or more candidate assisting nodes based on the information; and
- transmitting, to the subset of the one or more candidate assisting nodes, one or more instructions based on the information, wherein the one or more instructions configure the subset of the one or more candidate assisting nodes to form a single frequency network (SFN), and wherein the one or more instructions configure the subset of the one or more candidate assisting nodes to use a same set of synchronization signal blocks (SSBs) as a discovery signal.

* * * * *